Nov. 23, 1965 R. E. SCHWARTZ 3,219,395
FRICTION DEVICE OPERATING SYSTEM
Filed May 31, 1963 2 Sheets-Sheet 1

INVENTOR
ROBERT E. SCHWARTZ
BY
Joseph E. Pagin

INVENTOR
ROBERT E. SCHWARTZ
BY

United States Patent Office 3,219,395
Patented Nov. 23, 1965

3,219,395
FRICTION DEVICE OPERATING SYSTEM
Robert E. Schwartz, Clayton, Mo., assignor to Wagner Electric Corporation, St. Louis, Mo., a corporation of Delaware
Filed May 31, 1963, Ser. No. 284,657
6 Claims. (Cl. 303—6)

This invention pertains to friction device operating systems and in particular to a programmed system and control means therefor.

In the past, multi-axle vehicles, such as tractor-trailer trains, were provided with only the usual service brakes for deceleration and stopping purposes. Since such tractor-trailer trains are now being manufactured to increasingly larger gross-weight specifications in order to more economically transport increasingly larger pay loads, in some instances it is necessary to supplement the usual service brakes with a fluid cooled shoe or disc brake in order to effectively decelerate and stop such larger vehicles. The term "service brakes" refers to conventional brakes which are employed on a vehicle for inertia stopping applications, and the term "fluid cooled brakes" refers to braking mechanism through which a cooling fluid is circulated to provide relatively high heat dissipation characteristics during a braking application. The larger tractor-trailer trains are provided with as many as five axles and axle brake sets, and when fluid cooled brakes are employed, they are normally fitted as a brake set on only one vehicle axle while normal service brakes are fitted as brake sets on the other four axles. One of the more apparent disadvantages of a programmed brake system is that if the fluid cooled brakes were programmed to be brought into the braking application prior to the service brakes, the operator would feel as if he had lost his vehicle brakes since he would feel only a minor portion of the total braking available, i.e., said minor portion being supplied by the fluid cooled brakes; therefore, one of the main objects or purposes of the programmed brake system is to apply the fluid cooled brakes at a greater rate, or with a greater pressure buildup, than the service brakes. In other words, it has been determined that at average tractor-trailer train speeds of up to about thirty miles per hour, only about twenty p.s.i. of fluid pressure is needed to bring the tractor-trailer train to a complete stop; therefore, it is mandatory that the fluid cooled brakes be applied at a greater rate than the service brakes so that most of the deceleration or stopping would be accomplished by the fluid cooled brakes at fluid pressure less than about twenty p.s.i.

Other objects and advantages of the instant invention will become apparent hereinafter.

Briefly, the invention is embodied in a fluid pressure system having first and second friction devices, and control means for actuating one of said first or second friction devices at a greater rate than the other of said first or second friction devices at least at actuating fluid pressure less than a predetermined value. The invention more specifically is embodied in control valve means normally responsive to actuating fluid pressure in service friction devices for applying a proportional fluid pressure to fluid cooled friction devices when the actuating fluid pressure is less than a predetermined amount and for increasing the applied fluid pressure in amounts inversely proportional to increases in the actuating fluid pressure in excess of the predetermined value.

The invention further consists in the parts and in the arrangements and combinations of parts hereinafter described and claimed. In the accompanying drawings which form a part of this specification and in which like numerals refer to like parts wherever they occur:

Figure 1:
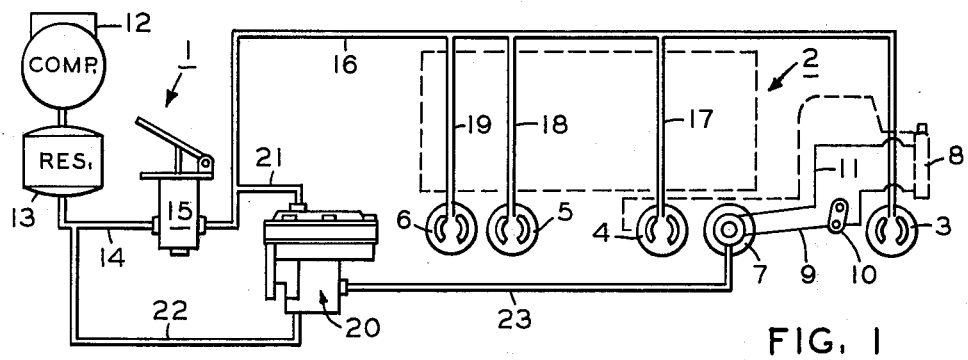
FIG. 1 is a diagrammatic view of a fluid pressure system for a typical tractor-trailer train which forms an embodiment of the present invention.

Referring now to FIG. 1 of the drawings in detail, a fluid pressure system 1 is shown for a typical tractor-trailer train or vehicle, indicated generally at 2 and shown in dashed outline form, having four axle sets of service friction devices or brakes 3, 4, 5, 6 and an axle set of liquid or fluid cooled friction device brakes 7. The vehicle 2 is provided with a radiator or heat exchanger 8 having an outlet or cool side connected by a conduit 9 to the inlet side of the fluid cooled brakes 7 with pumping means 10 interposed therein for the circulation of cooling fluid through said fluid cooled brakes, and a return conduit 11 is connected between the outlet side of said fluid cooled brakes and the inlet or hot side of said heat exchanger. The brake system 1 is provided with pressure generating means, such as a compressor 12, which is connected through a reservoir 13 by a conduit 14 to the inlet side of an application valve 15. The outlet side of the application valve 15 is connected by a conduit 16 and branch conduits 17, 18, 19 with the service brakes 3, 4, 5, 6, respectively. To complete the description of the system 1, a programmer or control valve 20 is provided with control, inlet and outlet ports which are respectively connected by conduits 21, 22 and 23 to the conduit 16 in open pressure fluid communication with the application valve 15, the conduit 14 in open pressure fluid communication with the reservoir 13, and the fluid cooled brakes 7.

Figure 2:
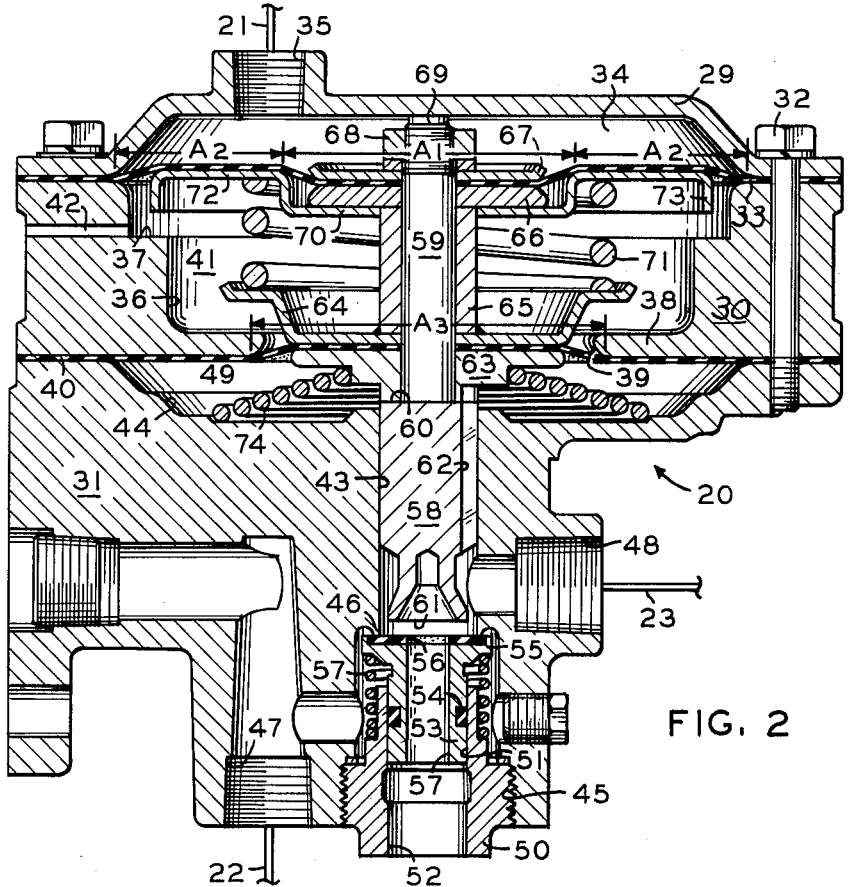
FIG. 2 is a greatly enlarged cross-sectional view of the control valve means, shown in FIG. 1, which also forms an embodiment of the present invention.

Referring now to FIG. 2, the control valve 20 is provided with upper, intermediate and lower housings 29, 30 and 31 which are connected together by suitable means, such as a plurality of studs 32. A diaphragm 33 is sealably interposed between the upper housing 29 and the upper end of the intermediate housing 30, and said diaphragm defines with said upper housing a control chamber 34. A control port 35 which receives the conduit 21, as previously mentioned, is provided in the upper housing 29 in open pressure fluid communication with the control chamber 34.

The intermediate housing 30 is provided with a centrally located stepped bore 36 having an annular abutment shoulder 37 axially spaced from the upper end thereof, and a radially inwardly extending flange 38 which defines a centrally located aperture 39 is integrally formed with said intermediate housing adjacent the lower end of said stepped bore. Another diaphragm 40 is sealably interposed between the lower end of the intermediate housing 30 and the lower housing 31, and an atmospheric chamber 41 is formed in the stepped bore 36 of the intermediate housing 30 between the diaphragms 33, 40, said atmospheric chamber being vented to atmosphere by a vent passage 42.

The lower housing 31 is provided with a centrally located bore 43 axially aligned between upper and lower stepped counterbores 44 and 45, and an annular shoulder or valve seat 46 is formed at the juncture of the bore 43 and lower counterbore 45. An inlet port 47 which receives the conduit 22, as previously mentioned, is provided in the lower housing 31 intersecting with the lower counterbore 45 adjacent to the valve seat 46, and an outlet port 48 which receives the conduit 23, as previously mentioned, is also provided in said lower housing intersecting the bore 43 adjacent to said valve seat. An outlet or reaction chamber 49 is defined in the upper counterbore 44 by the diaphragm 40 which serves to close said upper counterbore. A valve guide member 50 is threadedly received in the lower end of the lower counterbore 45 and has an axial valve guide bore 51 centrally provided therein, the lower end of said bore forming an exhaust port 52. An inlet valve element 53 is slidable in valve guide bore 51, and a seal 54 is carried by said valve element in sliding and sealing engagement with said bore. An enlarged sealing head 55 which includes an annular resilient seal 56 is provided on the valve element 53, and a valve spring 57 is interposed between the valve guide member 50 and said sealing head to normally bias the annular seal 56 into sealing engagement with the valve seat 46 and interrupt pressure fluid communication between the inlet and outlet port 47 and 48. An axial exhaust passage or opening 57 is provided through the valve element 53 to normally connect the outlet chamber 49, the lower housing bore 43 and the outlet port 48 in exhausting or open pressure fluid communication with the exhaust port 52.

A valve stem 58 is slidable in the lower housing bore 43 and is provided with an integral reduced extension 59 with an annular shoulder 60 therebetween. The lower free end of the stem 58 is reduced to form a valve seat 61 for engagement with the inlet valve element 53, and a flat 62 is formed on said stem between the shoulder 60 and said lower stem and to provide for pressure fluid flow between the lower housing bore 43 and the outlet chamber 49. A lower diaphragm mounting plate 63 is received on the stem extension 59 and seated on the stem shoulder 60, and the lower diaphragm 40 is sealably mounted between said plate and a spring retainer or lower diaphragm mounting plate 64 also received on said stem extension. A spacer member 65 is received on the stem extension 59 in abutting engagement between the spring retainer 64 and an upper diaphragm mounting plate 66, and the upper diaphragm 33 is sealably interposed between the plate 66 and another upper diaphragm mounting plate 67 by a retaining nut 68 which is threadedly received on the upper free end 69 of said stem extension. In this manner, the spacer 65 is positioned in abutment between the upper plates 66, 67 and diaphragm 33 and the lower plates 63, 64 and diaphragm 40 by the force of the retaining nut 68 so that said diaphragms control the movement of the stem 58. An annular disabling member or piston 70 is slidably received on the spacer member 65 and normally biased into engagement with the plate 66 by a spring 71 interposed between said disabling member and the spring retainer 64. The disabling member 70 is provided with a raised annular supporting surface 72 which seats a portion of the diaphragm 33 and a peripheral depending flange 73 for abutting engagement with the abutment or disabling shoulder 37 of the intermediate housing 30. A return spring 74 is interposed between the plate 63 and the end wall of the upper counterbore 44 in the outlet chamber 49 to normally urge the upper end 69 of the stem extension 59 into engagement with the upper housing 29 and maintain the stem valve seat 61 in predetermined spaced relation with the inlet valve element 53.

To complete the description of the control valve 20, it should be noted that the effective area of the diaphragm 33 includes the area $A_1$ bounded substantially by the inner edge of the raised surface 72 of the disabling member 70 and the peripheral annular area $A_2$. The effective area $A_3$ of the lower diaphragm 40 is substantially defined by the opening 39 through the intermediate housing flange 38. As defined, the sum of areas $A_1$ and $A_2$ is greater than the area $A_3$, and the area $A_3$ is greater than the area $A_1$.

In the operation of the brake system 1 and programmer or control valve 25, assume that an operator applied force on the application valve 15 applies or meters fluid pressure $P_1$ less than a predetermined amount, say for example about eight p.s.i., from the reservoir 13 through the conduits 14, 16, 17, 18, 19 to energize the service brakes 3, 4, 5, 6. The fluid pressure $P_1$ also flows through the conduit 21 to the control port 35 of the control valve 25 and therefrom into the control chamber 34 to act on the diaphragm 33. The applied fluid pressure $P_1$ acts on the effective areas $A_1$ and $A_2$ of the diaphragm 33 to create an input or downward force which moves the diaphragms 33, 40 and the component parts associated therewith and stem 58 downwardly against the relatively light compressive force of the return spring 74. This downward movement of the stem 58 initially engages the stem valve seat 61 with the seal 56 of the valve element 53 to close the exhaust opening 57 and interrupt pressure fluid communication between the outlet port 48 and the atmosphere, and further downward movement of said stem effects concert movement of said valve element therewith against the relatively light compressive force of the valve spring 57 to disengage the valve element seal 56 from the lower housing valve seat 46 and establish pressure fluid communication between the inlet and outlet ports 47 and 48. The pressure fluid communication established between the control valve inlet and outlet ports 47 and 48 permits pressure fluid flow from the reservoir 13 through conduits 14, 22, said inlet port, the lower housing counterbore 45 and bore 43, said outlet port and the conduit 23 to establish an output fluid pressure $P_2$ and energize the fluid cooled brakes 7. The fluid pressure $P_2$ is also established in the outlet chamber 49 via the flat or passage 62 between the stem 58 and lower housing bore 43 and acts on the effective area $A_3$ of the diaphragm 40. Since the areas $A_1$ and $A_2$ are larger than the area $A_3$, it is apparent that a larger fluid pressure $P_2$ is established acting on the smaller area $A_3$ of the diaphragm 40 to provide a reaction force which is substantially equal and opposite to the input force. As a result, the fluid pressure $P_2$ established in the outlet chamber 49 and in the liquid cooled brakes 7 increases in a ratio of fluid pressure $P_1$ in the control chamber 34 that is proportional to the areas $A_1$ and $A_2$ to $A_3$. In other words, the value of $P_2$, during a braking application of an intensity less than the assumed predetermined amount of twenty p.s.i., may be determined by the formula:

$$P_2 = \frac{P_1(A_1 + A_2)}{A_3}$$

In this manner, it is apparent that in braking applications of an intensity up to the predetermined fluid pressure, an increase in the applied or control fluid pressure $P_1$ must be balanced by a greater value of output fluid pressure $P_2$ so that the fluid pressure to the liquid cooled brakes increases at a greater rate than the fluid pressure to the service brakes whereby the fluid cooled brakes assume the greater braking load for snubbing type brake application or for the lower or less intense braking applications which, of course, occur more frequently than the more intense inertia braking applications.

Figure 3:
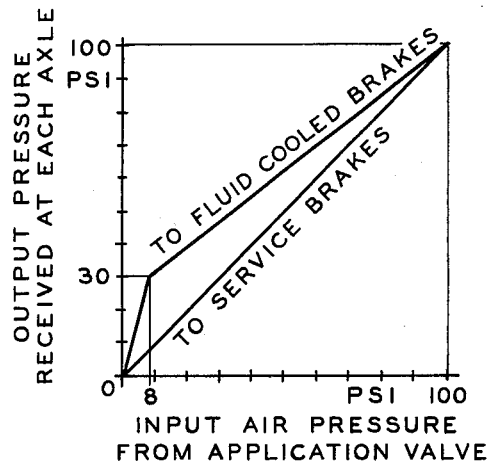
FIG. 3 is a graphic illustration of representative fluid pressures at the friction devices of the fluid pressure system during actuation thereof.

Referring now to FIG. 3 wherein a representative braking application is shown graphically, it will be noted that fluid pressure in both the service brakes and fluid cooled brakes increase linearly with increases in the fluid pressure applied through the application valve 15. It will be noted that the fluid cooled brakes are applied at a greater rate than that of the service brakes so that the fluid cooled brakes assume the greater braking load until the established fluid pressure at the service brakes attains the predetermined value of about eight p.s.i. and thereafter the service brakes are applied at a greater rate than that of the fluid cooled brakes in order to take over or assume the greater portion of the braking load or application.

When the reaction force $P_2A_3$ of the control valve 25 substantially equals the input force $P_1(A_1+A_2)$, the diaphragms 33, 40 move the stem 58 upwardly to a lapped position with the valve element 53, and said valve element is also moved upwardly into a lapped position with the seat 46. In this lapped position, pressure fluid communication is interrupted between the inlet and outlet ports 47 and 48 and between the outlet and exhaust ports 48 and 52.

If a greater braking effort is desired wherein the fluid pressure $P_1$ is increased to a value greater than the predetermined value, the applied force on the application valve 15 is increased which, of course, effects an increase in the fluid pressure $P_1$ delivered to the service brakes 3, 4, 5, 6 and to the control valve 20. Upon the establishment of the increased fluid pressure $P_1$ greater than the predetermined amount in the control chamber 35 of the control valve 20, the increased control fluid pressure $P_1$ acts on the area $A_2$ of the diaphragm 33 creating a disabling force which overcomes the opposing compressive force of the spring 71 acting on the disabling member 70 and moves said disabling member downwardly relative to the diaphragm 40 and against the compressive force of said disabling spring to a disabled position wherein the flange 73 thereof is abuttingly engaged with the intermediate housing shoulder. With the disabling member 70 in its disabled position, it is apparent that the effective area $A_2$ of the diaphragm 33 is also disabled so that only the area $A_1$ is now available to oppose the area $A_3$ of the diaphragm 40. The increased control fluid pressure $P_1$ also acts on the area $A_1$ to again move the stem 58 downwardly to disengage the valve element 53 from its lapped engagement with the seat 46. With the valve element 53 again unseated, pressure fluid communication is re-established between the inlet and outlet ports 47 and 48 to proportionally increase the established output pressure $P_2$ to the fluid cooled brakes. Since the area $A_2$ of the diaphragm 33 is disabled and the now effective area $A_1$ thereof is smaller than the area $A_3$, it is apparent that a greater control fluid pressure $P_1$ is established acting on the smaller effective area $A_1$ of the diaphragm 33 to maintain the input force substantially equal to the reaction force. As a result, the output fluid pressure $P_2$ established in the fluid cooled brakes 7 and outlet chamber 49 increases in a ratio to the increased control fluid pressure $P_1$ above the predetermined value that is proportional to the areas $A_1$ to $A_3$. In other words, the value of $P_2$, during the portion of the braking application where $P_1$ is greater than the predetermined value, may be determined by the formula:

$$P_2 = \frac{P_1(A_1)}{A_3}$$

In this manner, it is apparent that in braking applications of an intensity greater than the predetermined fluid pressure, an increase in the applied or control fluid pressure $P_1$ must be balanced by a lesser value of output fluid pressure $P_2$ so that the fluid pressure to the fluid cooled brakes now increases at a lesser rate or a rate inversely proportional to the increased control fluid pressure $P_1$ to the service brakes whereby the service brakes assume the greater braking load for higher or more intense inertia braking applications.

Upon completion of the desired deceleration or a complete stop, the applied force is removed from the application valve 15, the fluid pressure $P_1$ is exhausted to atmosphere to de-energize the service brakes 3, 4, 5, 6 through the conduits 16, 17, 18, 19 and said application valve, the fluid pressure $P_1$ is also exhausted from the control chamber 34 of the control valve 20 through the control port 35, the conduit 21, and said application valve. With the control fluid pressure $P_1$ so exhausted, the compressive force of the disabling spring 71 returns the disabling member 70 into its original position in abutment with the diaphragm plate 66 to eliminate the disabling force, and the compressive force of the return spring 74 along with the reaction force $P_2A_3$ acts to move the diaphragms 33, 40 and parts associated therewith and the stem 58 to their original or inoperative positions which allows the valve element 53 to re-engage the seat 46 and opens the exhaust passage 57 to exhaust the output fluid pressure $P_2$ to atmosphere from the outlet chamber 49 and the fluid cooled brakes 7 thereby eliminating the reaction force and de-energizing said fluid cooled brakes.

From the foregoing it is now apparent that a novel programmed fluid pressure system and valve means therefor has been provided wherein the application of some of the friction devices is initiated at a greater rate than other friction devices when the application fluid pressure is less than a predetermined amount and wherein the application of said same friction devices is at a rate inversely proportional to said other friction devices when said application fluid pressure exceeds the predetermined amount.

It is now apparent that a novel fluid pressure system and valve means therefor meeting the objects and advantages set out hereinbefore are provided and that changes or modifications to the precise configurations, shapes, areas or details of the constructions set forth in the disclosure by way of illustration may be made by those skilled in the art without departing from the spirit of the invention as defined by the claims which follow.

What I claim is:

1. A control valve comprising a housing having a pressure fluid flow passage therethrough, stop means in said housing, application means including a pair of opposed members concertly and relatively movable in said housing for controlling the application of fluid pressure through said flow passage, a pair of fluid pressure responsive areas on one of said members, and means interconnecting said pair of members to provide concert movement thereof toward a position effecting the application of pressure fluid flow through said flow passage upon the subjection of said pair of areas to fluid pressure, the applied fluid pressure acting on the other of said members to oppose further concert movement of said pair of members and being in a predetermined ratio with the fluid pressure acting on said pair of areas of said one member, said interconnecting means also including relatively movable means and pre-compressed resilient means normally caged between said pair of members, said resilient means urging said relatively movable means into engagement with said one member to define therewith one of said areas, said one member and said relatively movable means being movable relative to said other member and against said resilient means in response to fluid pressure acting on said one area in excess of a predetermined value toward a position engaging said relatively movable means with said stop means and disabling said one area, and said pair of members being thereafter further concertly movable in response to fluid pressure in excess of the predetermined value acting on only the other of said areas to effect applied fluid pressure acting on said other member in another ratio with the fluid pressure in excess of the predetermined value acting on said other area different than the predetermined ratio.

2. The control valve according to claim 1 wherein said one and other members include one and other spaced diaphragm means clamped in said housing and defining therewith opposed control and reaction chambers, said one diaphragm means having a control surface thereon in said control chamber including said pair of areas and said other diaphragm means having a reaction surface thereon in said reaction chamber.

3. The control valve according to claim 2 wherein said relatively movable means comprises an annular retainer member movable between a caged position in engagement with a portion of said interconnecting means adjacent to said one diaphragm means and a disabled position in engagement with said stop means, a first annular abutment on said retainer member for engagement with a portion of said interconnecting means, a second annular abutment on said retainer member for engagement with said stop means and spaced radially outwardly of said first abutment, and a third annular abutment on said retainer member between said first and second abutments for engagement with the side opposite said control surface of said one diaphragm means to define therewith said one area, said resilient means normally urging said retainer member in a direction to disengage said second abutment from said stop means and engage said first and third abutments with said interconnecting means and said one diaphragm means.

4. The control valve according to claim 2 wherein said interconnecting means comprises a spacer member between said one and other diaphragm means and having opposed ends for respective sealing engagement therewith, connection means engaged between said control and reaction surfaces and respectively urging said one and other diaphragm means into engagement with said spacer member opposed ends, and said relatively movable means including a retainer member movable on said spacer member between one of said spacer member opposed ends and said stop means, said resilient means being biased between the other of said spacer member opposed ends and said retainer member to normally urge said retainer member away from said stop means into abutment with said one spacer member opposed end and into engagement with said one diaphragm means to define therewith said one area.

5. The control valve according to claim 2 comprising another chamber defined in said housing between said one and other diaphragm means and vented to the atmosphere, said interconnecting means extending through said other chamber between said one and other diaphragm means, said stop means including a shoulder on said housing and in said other chamber, and said relatively movable means including a retainer member movable in said other chamber between said one diaphragm means and said shoulder, said resilient means being biased between a portion of said interconnecting means adjacent to said other diaphragm means and said retainer member to urge said retainer member away from said shoulder into engagement with another portion of said interconnecting means adjacent to said one diaphragm means and also into engagement with said one diaphragm means to define therewith said one area.

6. The control valve according to claim 5 wherein said interconnecting means includes a first pair of support plates for respective sealing engagement with said reaction and control surfaces, a second pair of support plates for respective sealing engagement with the other surfaces of said pair of diaphragm means in said other chamber and opposite said control and reaction surfaces, a spacer member in said other chamber connected between said second pair of plates, and clamping means extending through said spacer member, said pair of diaphragm means and said first and second pairs of plates and connected in clamping engagement with said second pair of plates to urge said first and second pairs of plates into sealing engagement with said pair of diaphragm means, respectively, an aperture in said retainer member in guiding engagement with said spacer member, a first abutment on said retainer member about said aperture for engagement with one plate of said second pair of plates, a second abutment on said retainer member for engagement with said shoulder and radially spaced from said first abutment, said one area being concentrically disposed about said other area on said control surface, an annular portion between said first and second abutments on said retainer member for engagement with said one diaphragm means to define therewith said one area, said resilient means including a spring having one end engaged with the other plate of said second pair of plates and the other end thereof engaged with said retainer member to normally urge said first abutment and said retainer member annular portion into engagement with said one plate of said second pair of plates and said one diaphragm means, respectively, and to urge said second abutment away from said shoulder, said retainer member being movable against said spring in response to the fluid pressure in excess of the predetermined value acting on said one area to a position disengaging said first abutment from said one plate of said second pair of plates and engaging said second abutment with said shoulder, said one area being disabled upon the engagement of said second abutment means and shoulder and said one diaphragm means being thereafter responsive to fluid pressure in excess of the predetermined value acting on only said other area.

References Cited by the Examiner
UNITED STATES PATENTS

| | | | |
|---|---|---|---|
| 2,702,096 | 2/1955 | Rockwell | 188—52.11 |
| 2,714,534 | 8/1955 | Keller | 303—38 |
| 2,985,490 | 5/1961 | Gates | 303—40 |
| 3,018,136 | 1/1962 | Williams | 303—6 |
| 3,095,246 | 6/1963 | Alfieri | 303—40 |
| 3,118,706 | 1/1964 | Gold et al. | 303—60 |
| 3,148,919 | 9/1964 | Simmons et al. | 303—3 |

BENJAMIN HERSH, *Primary Examiner.*
FERGUS S. MIDDLETON, EUGENE G. BOTZ,
*Examiners.*